United States Patent Office 2,940,927
Patented June 14, 1960

2,940,927

COMPOSITION FOR AND METHOD OF INHIBITING CORROSION OF METALS

William B. Hughes, Webster Groves, Mo., assignor to Cities Service Research and Development Company, New York, N.Y., a corporation of New Jersey No Drawing. Filed Dec. 12, 1955, Ser. No. 552,264

6 Claims. (Cl. 252—8.55)

This invention relates to inhibiting corrosion of metals, and more particularly relates to an improved composition and process for the prevention of corrosion in natural gas production, collection and distribution systems.

In the production of natural gas, and especially when the producing wells are high pressure wells of the type generally known as gas-condensate wells, some water, along with condensible hydrocarbon fluids, tends to condense out of the gas and coat the walls of the gathering and distribution lines. When carbon dioxide or traces of organic acids are present in the gas as is generally the case, they tend to dissolve in the condensed water to form highly corrosive solutions which rapidly eat their way through the lines.

Various methods have been proposed in the past for controlling this type of corrosion. In larger systems such as main gas lines it has sometimes been found profitable to install gas dryers, but the expense of installing such dryers is usually prohibitive in smaller systems, especially in gas collecting lines where the corrosion problem is most acute. In such lines certain chemical inhibitors have been found to be of some use, but even the best of the inhibitors now commercially available have not proven entirely satisfactory. While they do reduce corrosion to some extent, even with their use corrosion continues to such an extent as to pose a serious economic problem.

I have now discovered that corrosion of the type described above may be substantially inhibited by introducing into the production, collecton, and distribution lines or equipment a small but sufficient quantity of the reaction product obtained by first reacting 2 mols of a polyamine with 1 mol of a dicarboxylic acid to provide an intermediate bis-imidazoline and thereafter reacting the intermediate bis-imidazoline compound with from 1 to 4 mols of ethylene oxide.

In preparing the new compound which I have found to be uniquely effective in reducing corrosion, I first react 2 mols of the polyamine with 1 mol of a dicarboxylic acid under conditions which permit the removal of 2 mols of water from the reaction mixture. The product obtained, a bis-imidazoline hereafter referred to as the intermediate product, is thereafter reacted with from 1 to 4 mols of ethylene oxide under conditions which effect the addition of the ethylene oxide to the bis-imidazoline structure. This final product is believed to be hitherto unknown. The exact nature of the linkage between the ethylene oxide and the bis-imidazoline structure is not clear. It is believed, however, that the ethylene oxide adds to the terminal amine group present in the imidazoline ring. The length of the chain containing the free amine group of the bis-imidazoline compound will depend on the particular polyamine used in preparing the bis-imidazoline compound. I have found that any of the following polyamines can be used, ethylene diamine, diethylene triamine, triethylene tetramine and tetraethylene pentamine. With respect to the dicarboxylic acid used in preparing the bis-imidazoline structure, I have found that dicarboxylic acids having from about 4 to 20 carbon atoms are preferred. Among the dicarboxylic acids which I have used with satisfaction are succinic acid, terephthalic acid, mucic acid, sebacic acid and diglycolic acid. In addition to the foregoing, the following dicarboxylic acids can be used: glutaric acid, adipic acid, pimelic acid, suberic acid, azelaic acid and tartaric acid.

In order to more fully understand the nature of the compound of my invention and the method by which they are obtained the following examples are provided, it being understood that the number of compounds of my invention preparable by the method described are not limited to the particular compounds exemplified.

EXAMPLE 1

To 186 grams (1.0 mol) of tetraethylene pentamine, 300 grams (0.5 mol) of dimerized linoleic acid prepared according to the method described in the Journal of the American Oil Chemists Society, 24, 65 (March 1947) and hereinafter referred to as dimer acid were added. To this mixture 100 ml. of toluene were added and the resulting mixture charged to a boiling flask equipped with a decanter still head having attached thereto a reflux condenser, the mixture was heated to remove the water-toluene azeotrope with the water being collected in the water trap and the toluene being returned to the reaction mixture. At the end of a 6 hour reaction period, 35.6 grams of water had been removed from the mixture. This represents substantially the theoretical quantity which would have been removed in a 1:1 molar reaction between the carboxyl groups of the acid and the 1,2-diamines present. The toluene was then removed from the reaction zone by distillation leaving an amber colored bis-imidazoline reaction product which was solid at room temperature. The final product had a molecular weight of 892. The theoretical molecular weight value for this compound is 900.

To prepare the new compound of my invention, 89.2 (0.1 mol) of the intermediate product obtained above was dissolved in 200 ml. of isopropyl alcohol. Ethylene oxide was then bubbled into this solution at room temperature. An immediate rise in temperature of about 26° C. was noted, indicating a reaction between the free amine present in the intermediate product and the ethylene oxide. After 2 hours of reaction during which ethylene oxide gas was continuously passed into the solution, the solution temperature had returned to room temperature with no more of the gas being dissolved in the solution. The reaction was discontinued and it was determined that 22.6 grams of ethylene oxide was added to the intermediate product. The alcohol solvent and excess ethylene oxide were then removed by distillation leaving a dark colored product which was soluble in water and produced viscous solutions in concentration as low as 1% by weight. These solutions were clear. The molecular weight of the final reaction product was found to be 1060. This is to be compared with a theoretical molecular weight of 1068, which would represent the addition of 4 mols of ethylene oxide to the bis-imidazoline molecule. The product was soluble in mineral acids and in water producing therein clear solutions. The product was found to increase solution viscosity and to lower surface tension.

The final reaction product was tested as a corrosion inhibitor and provided the protection indicated for inhibitor No. 2 in the table which follows.

EXAMPLE 2

Following the procedure outlined in Example 1 above, 103 grams (1.0 mol) of diethylene triamine was reacted with 300 grams (0.5 mol) of dimer acid to produce oil-soluble tacky, brown solid bis-imidazoline product having a molecular weight of 730. This is to be compared with a theoretical molecular weight value of 734 for the bis-imidazoline obtainable by reacting the compounds described above.

Ethylene oxide was then added to the intermediate bis-imidazoline reaction product according to the method previously described and produced a final reaction product of dark color which was water soluble and having a molecular weight of 819. This molecular weight value of 819 is substantially the theoretical weight value for the addition of 2 mols of ethylene oxide to the intermediate reaction product obtained.

The results of the protection against corrosion provided by the final reaction product herein are recorded in the table which follows. The product of this example is identified in the table as corrosion inhibitor No. 6.

EXAMPLE 3

According to the procedure followed in Example 1, 146 grams (1.01 mol) of triethylene tetramine was reacted with 59 grams (0.5 mol) of succinic acid with water being removed to provide an intermediate product which was thereafter reacted with ethylene oxide according to the method described to provide a final reaction product having a molecular weight of 411. This is to be contrasted with the theoretical molecular weight value of 414 obtainable by the addition of 4 mols of ethylene oxide to the intermediate bis-imidazoline obtainable by the reaction of triethylene tetramine and succinic acids in the amount defined.

The final reaction product was light yellow in color, viscous, and completely soluble in water.

The final product tested as a corrosion inhibitor provided the results recorded for inhibtor No. 8 in the table which follows.

EXAMPLE 4

Following the method described in Example 1, a bis-imidazoline intermediate reaction product was obtained by reacting 292 grams (2.0 mols) of triethylene tetramine with 166 grams (1.0 mol) of terephthalic acid. The intermediate reaction product obtained was then treated with ethylene oxide for a period of about 3 hours and provided a final reaction product having a molecular weight of 285. The product was lemon yellow in color, a semi-solid at room temperature and completely soluble in water and mineral acids. The molecular weight determined indicated that 4 mols of ethylene oxide were added to the intermediate bis-imidazoline compound.

This product was tested as a corrosion inhibitor according to the method hereinafter described and provided the protection indicated in the table which follows. This final product is identified as inhibitor No. 10 in the table.

EXAMPLE 5

To 292 grams (2.0 mols) of triethylene tetramine, 202 grams (1.0 mol) of sebacic acid was added with heat and an azeotrope forming solvent according to the method set forth in Example 1 to produce an intermediate bis-imidazoline having an amber color and a molecular weight of 420. This intermediate product was a heavy syrup and was oil soluble.

The intermediate product was thereafter modified with ethylene oxide to produce a light-colored semi-solid product which was soluble in water and in mineral acids and is identified as corrosion inhibitor No. 12 in the table which follows.

EXAMPLE 6

According to the method described in Example 1, triethylene tetramine was reacted with mucic acid in a 2:1 molar ratio. The product obtained was thereafter treated with ethylene oxide to provide a dark yellow semi-solid product having a molecular weight of 422. The theoretical molecular weight for this compound in which 2 mols of ethylene oxide was treated, the intermediate product is 430. The final product was readily soluble in water and in mineral acids and is identified as corrosion inhibitor No. 14 in the table which follows.

The effectiveness of my new compounds in reducing the corrosion in natural gas production, collection and distribution systems may be more fully understood by reference to certain tests which I have conducted, using prepared acidic brines which substantially duplicate well conditions. The test procedure involved a measurement of the corrosive action of the hypothetical well fluid as inhibited with my new compounds described above upon weighed, cleaned and polished strips of number 18 gauge cold rolled steel measuring one-quarter inch by four inches, under conditions closely approximating conditions existing in a producing well and a comparison thereof with the results obtained by subjecting identical strips to the corrosive action of my hypothetical well fluid without inhibitor added.

The tests which I have conducted may be either of a dynamic or static type. In carrying out tests of the new compounds described herein, the dynamic method was used. In this method, an apparatus was utilized which dips the test panels alternately through two phases of the corrosive medium at a rate of three times per minute. The corrosive medium was held in a one liter three neck round bottom flask equipped with a heater, mercury sealed stirrer, a reflux condenser, and means for passing gas into the bottom of the corrosive medium. The stirrer was replaced by a glass hook adapted to carry the test strip. The test hook was driven by a small electric motor through a cam arrangement.

The hypothetical corrosive medium comprised a 5 weight percent solution of sodium chloride to which had been added 0.2 ml. of a mixture of 50 weight percent formic acid and 50 weight percent acetic acid. To this acid mixture a varying amount of kerosene was added (10 to 400 ml.) and carbon dioxide or natural gas was allowed to pass through the mixture during the test. The variation of kerosene volume allowed tests to more nearly simulate conditions existing either in a condensate well or those existing in a gas pipe line.

In carrying out the test, the corrosive medium was heated to boiling and the gas introduced. A punched, cleaned, weighed test panel was suspended on the glass hook and the dipping process started and allowed to continue for 90 minutes. At the end of this time, the test panel was removed, cleaned, dried, and weighed to give a blank loss.

The inhibitor was introduced into the corrosive medium and the test conducted on a comparative weighed test strip for an additional 90 minutes. At the end of this time, the test strip was again cleaned and weighed to give an inhibited test loss. The changes in weight of the test strips during the tests are taken as a measurement of the effectiveness of the inhibitor being used.

A percentage protection afforded by the respective compound being tested may be calculated for each inhibitor in accordance with the following formula $$\frac{L1-L2}{L1} \times 100 = \text{percent protection}$$

in which L1 is the loss in weight of the strips taken from the uninhibited test, and L2 is the loss in weight of the strips taken from the inhibited test.

Since it is important that the test strips be free of contaminants, cleaning of the strips is an important feature of this test. Normally in cleaning, the test strip, after contact with the corrosive fluid either with or without inhibitor, is washed in kerosene, then in methanol, and finally washed with water prior to acid cleaning. The acid cleaning consists of treating the test strip in a 1 weight percent hydrochloric acid solution for a few seconds, washing with water, and thoroughly wiping with cheesecloth. The acid treatment is repeated several times until the original luster of the test strip is obtained as nearly as possible with a minimum amount of acid treating. After acid treating was completed, the strips were again washed in methanol, followed by acetone, and were then reweighed to determine the weight loss.

Since the effectiveness of the improved compositions of my invention will be readily apparent by referring to the table which follows in which comparative results are recorded in terms of percent protection for 50 and 100 parts per million of the inhibitors listed therein. It will be noted that a comparison is provided in the table between the intermediate bis-imidazoline compounds and the new improved final reaction products of my invention. In all cases it is evident that the addition of ethylene oxide to the bis-imidazoline structure provides substantially superior results.

Table

| Number | Inhibitor | Mol Ratio | Dynamic Test | |
|---|---|---|---|---|
| | | | Percent, 50 p.p.m. | Protection, 100 p.p.m. |
| 1 | TEPA¹ Dimer Acid | 2:1 | 70.4 | 83.1 |
| 2 | TEPA¹ Dimer Acid Etoxide | 2:1:4 | 81.3 | 98.1 |
| 3 | TETA² Dimer Acid | 2:1 | 68.9 | 83.7 |
| 4 | TETA² Dimer Acid Etoxide | 2:1:4 | 87.9 | 97.0 |
| 5 | DETA³ Dimer Acid | 2:1 | 71.3 | 81.0 |
| 6 | DETA³ Dimer Acid Etoxide | 2:1:2 | 83.8 | 96.1 |
| 7 | TETA Succinic 2 | 2:1 | 74.2 | 92.9 |
| 8 | TETA Succinic Etoxide | 2:1:4 | 94.3 | 99.1 |
| 9 | TETA Terephthalic | | 70.8 | 89.9 |
| 10 | TETA Terephthalic Etoxide | 2:1:4 | 90.1 | 98.7 |
| 11 | TETA Sebacic | 2:1 | 89.9 | 94.2 |
| 12 | TETA Sebacic Etoxide | 2:1:2 | 92.8 | 98.6 |
| 13 | TETA Mucic | 2:1 | 63.9 | 81.9 |
| 14 | TETA Mucic Etoxide | 2:1:2 | 78.8 | 96.0 |
| 15 | EDA⁴ Diglycolic Acid Etoxide | 2:1:2 | 31.8 | 40.3 |
| 16 | EDA⁴ Diglycolic Acid | 1:2 | 88.7 | 89.2 |

¹ TEPA—tetraethylene pentamine.
² TETA—triethylene tetramine.
³ DETA—diethylene triamine.
⁴ EDA—ethylene diamine.

It will be evident from the foregoing table that corrosion may be effectively reduced to a value of one-tenth or less of that due to the natural flow of corrosive fluids through well tubing and pipe lines by incorporating in the system a comparatively small amount of the improved compounds of my invention.

While the tests were conducted with amounts of inhibitor amounting to 50 or 100 p.p.m. for comparison purposes, more or less inhibitor may be used, depending on the corrosiveness of the aqueous phase present in the well and pipe line. In actual use in the field, the concentration of inhibitor must, of course, be adjusted to the particular conditions existing therein, provided only that the inhibitor is introduced in an amount sufficient to substantially inhibit corrosion. I have found that excellent results are obtained by dissolving the inhibitor in an appropriate amount of water in order to better control the amount of inhibitor used and injecting the inhibitor solution into the well or into the transfer lines as near to the well head as possible. The gas current flowing through the lines is then effective to mix the inhibitors with the corrosive fluids present and to sweep the inhibitor throughout the system, affording protection to all metal equipment with which it comes in contact after the point of injection.

It is to be understood that the improved compositions of my invention are not limited to use alone and may be applied along with other agents commonly introduced into wells and pipe lines for breaking emulsions, preventing scale formations, minimizing pitting, etc. It is further evident that my invention is not restricted to the use of my improved compositions for inhibiting corrosion in oil and gas wells and associated equipment, but may be employed to perform this function in the presence of corrosive fluids derived from many other sources.

Having now described my invention, what I claim as new and useful is:

1. The method of inhibiting corrosion of ferrous metal in oil and gas wells and associated equipment by adding to the corrosive fluids present therein a small but sufficient quantity of the final reaction product obtained by first condensing 2 mols of a polyamine selected from the group consisting of tetraethylene pentamine, triethylene tetramine, diethylene triamine, and ethylene diamine with 1 mol of a dicarboxylic acid selected from the group consisting of an acid having from 4 to 20 carbon atoms and dimerized linoleic acid under conditions which permit removal of 4 mols of water from the reaction mixture to provide an intermediate bis-imidazoline reaction product, introducing into the intermediate reaction product from 1 to 4 mols of ethylene oxide and passing the corrosive fluids in contact with the metal to be protected.

2. The method of inhibiting corrosion of the metal in oil and gas wells and associated equipment as claimed in claim 1, wherein the polyamine is tetraethylene pentamine.

3. The method of inhibiting corrosion of the metal in oil and gas wells and associated equipment as claimed in claim 1, wherein the polyamine is triethylene tetramine.

4. The method of inhibiting corrosion of the metal in oil and gas wells and associated equipment as claimed in claim 1, wherein the polyamine is diethylene triamine.

5. The method of inhibiting corrosion of the metal in oil and gas wells and associated equipment as claimed in claim 1, wherein the polyamine is ethylene diamine.

6. The method of inhibiting corrosion of ferrous metal in oil and gas wells and associated equipment by adding to the corrosive fluids present therein a small but sufficient quantity of the final reaction product obtained by first condensing 2 mols of a polyamine selected from the group consisting of tetraethylene pentamine, triethylene tetramine, diethylene triamine and ethylene diamine with 1 mol of a dicarboxylic acid selected from the group consisting of an acid having from 4 to 20 carbon atoms and dimerized linoleic acid removing 4 mols of water from the reaction mixture to provide an intermediate bis-imidazoline reaction product, introducing into the intermediate product 2 mols of ethylene oxide and passing the corrosive fluid containing the final reaction product in contact with the metal to be protected.

References Cited in the file of this patent

UNITED STATES PATENTS

| 2,211,001 | Chwala | Aug. 13, 1940 |
| 2,488,094 | Graenacker et al. | Nov. 15, 1949 |
| 2,792,390 | Stromberg | May 14, 1957 |
| 2,819,284 | Shen | Jan. 7, 1958 |

OTHER REFERENCES

Ferm et al.: Chem. Reviews, vol. 54, pages 595, 606 (1954).